United States Patent [19]
Farmer

[11] Patent Number: 5,853,281
[45] Date of Patent: Dec. 29, 1998

[54] LOADING RAMP FOR RECREATIONAL VEHICLES

[76] Inventor: Mervin Blair Farmer, Box 1070, Stonewall, Manitoba, Canada, R0C 0Z0

[21] Appl. No.: 767,273

[22] Filed: Dec. 16, 1996

[51] Int. Cl.[6] .................................................. B65G 67/02
[52] U.S. Cl. .......................... 414/537; 193/35 R; 193/37; 296/61
[58] Field of Search .................................. 414/537, 529, 414/532; 296/61; 193/35 R, 37

[56] References Cited

U.S. PATENT DOCUMENTS

| | | | |
|---|---|---|---|
| 3,687,314 | 8/1972 | Haughland | 414/537 |
| 3,690,481 | 9/1972 | Pelletier | 414/537 |
| 3,818,528 | 6/1974 | Petersen | 414/537 |
| 4,478,549 | 10/1984 | Stelly et al. | 414/537 |
| 4,926,995 | 5/1990 | Kauffman | 198/780 |
| 5,538,308 | 7/1996 | Floe | 414/537 |

*Primary Examiner*—Thomas J. Brahan
*Attorney, Agent, or Firm*—Murray E. Thrift; Adrian D. Battison

[57] ABSTRACT

A ramp is used for loading and unloading recreational vehicles, especially snowmobiles, trucks, trailers and the like. The preferred ramp is a three section ramp with two outer sections and a center section connected to fold from side to side for storage and transport purposes. Each outer ramp section is equipped with a series of rollers spaced along the ramp section to allow the skis of a snowmobile to advance along the ramp without binding. The rollers are preferably made with a rigid core and a rotating outer sleeve of PVC. The tubing is slit helically from end to end so that it can be removed and installed without dismantling the ramp. The center section of the ramp is equipped with lateral cleats.

7 Claims, 4 Drawing Sheets

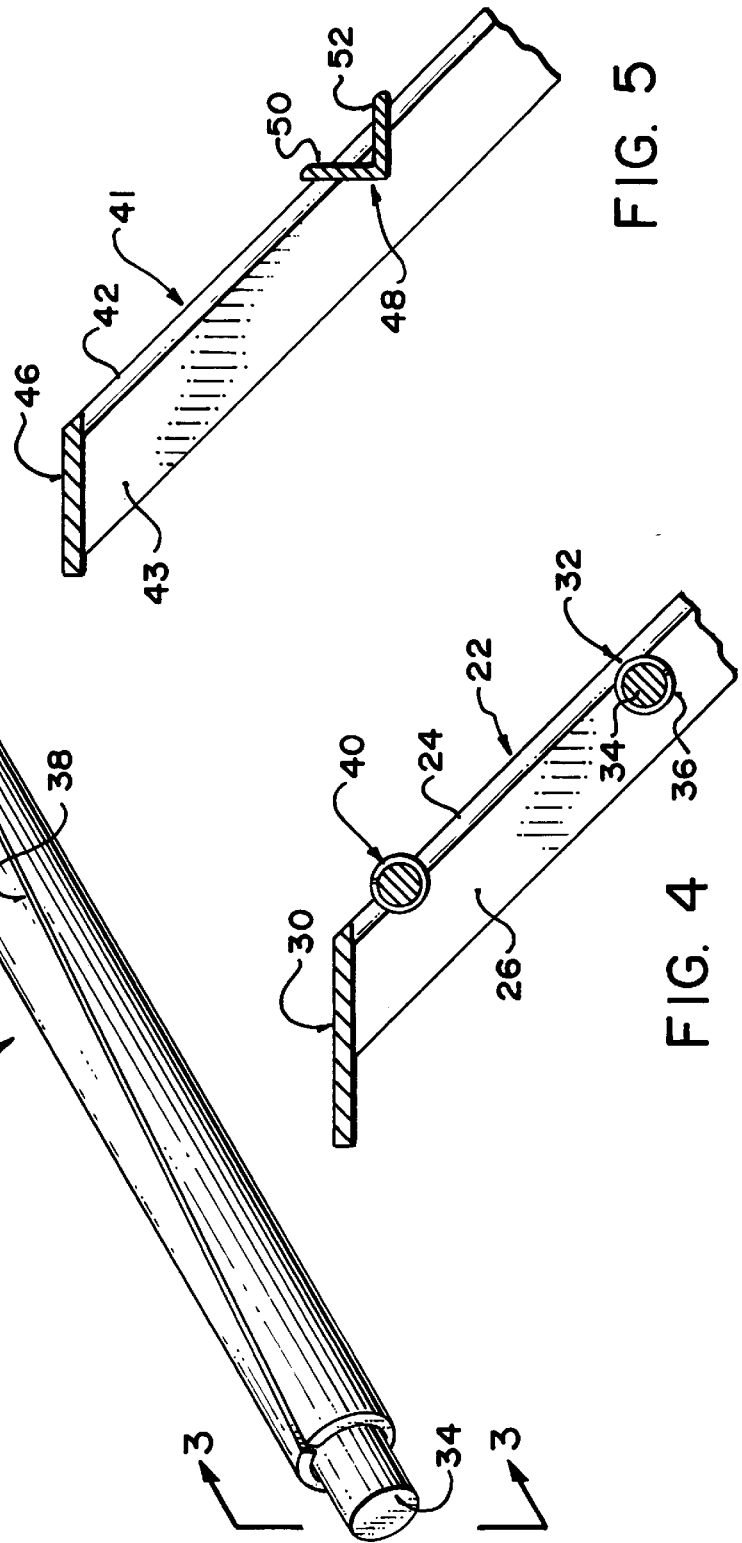

LOADING RAMP FOR RECREATIONAL VEHICLES

FIELD OF THE INVENTION

The present invention relates to loading ramps for loading and unloading recreational vehicles onto and off of trucks and trailers, and particularly to such ramps capable of loading snowmobiles.

BACKGROUND

Various loading ramps have been proposed for loading all types of vehicles onto trucks and trailers. These are generally unsuitable for loading modern snowmobiles because the hard metal runner blades on the skis do not slide well on ramp decks made of either metal or wood. The runner blades dig into the ramp, making it difficult or impossible to load the snowmobile. The present invention is concerned with a ramp configuration that overcomes this problem.

SUMMARY

According to one aspect of the invention there is provided a ramp for loading and unloading recreational vehicles comprising:

two spaced apart rails; and a plurality of rollers extending between the rails and spaced therealong.

The rollers allow the snowmobile skis to travel along the ramp without binding.

Each roller is preferably a high density polyvinyl chloride (PVC) pipe surrounding a metal rod. The roller may be slit along its length with a slight helical twist to the slit. This provides for easy installation and removal of the rollers without dismantling the ramp. Without the plastic tubes in place, the ramp can be used for applications other than snowmobiles, for example all terrain vehicles and other wheeled devices. With the tubes in place, the ramp is also useful for loading non wheeled items other than snowmobiles, for example boats.

According to another of the present invention there is provided a ramp for loading and unloading snowmobiles comprising:

two longitudinally extending, laterally spaced apart ski supporting sections, each comprising a plurality of laterally extending, longitudinally spaced apart rollers; and a track supporting section between the ski supporting sections, the track supporting section comprising means for tractional engagement with a snowmobile track.

The three part ramp provides complete support to a snowmobile when loading. The sections may be hinged on longitudinal axes so that the ramp will collapse readily for storage and transportation.

To support the ramp in place, for example on a truck tail gate, a flat plate extends across the top end of each section, sloping from front to back at a 45° angle to the longitudinal extent of the ramp section. Two flexible tethers are adjustably attached to the upper end of the ramp and have hooks or other anchors to be engaged with a fixed structure on the truck, trailer or the like.

Other features that may be included in embodiments of the present invention will become apparent from the following.

BRIEF DESCRIPTION OF THE DRAWINGS

In the accompanying drawings which will illustrate an exemplary embodiment of the invention:

FIG. 2 is a detail view of a roller.

FIG. 3 is a view along line 3—3 of FIG. 2;

FIG. 4 is a cross section along line 4—4 of FIG. 1;

FIG. 5 is a cross section along line 5—5 of FIG. 1;

DETAILED DESCRIPTION

Figure 1:
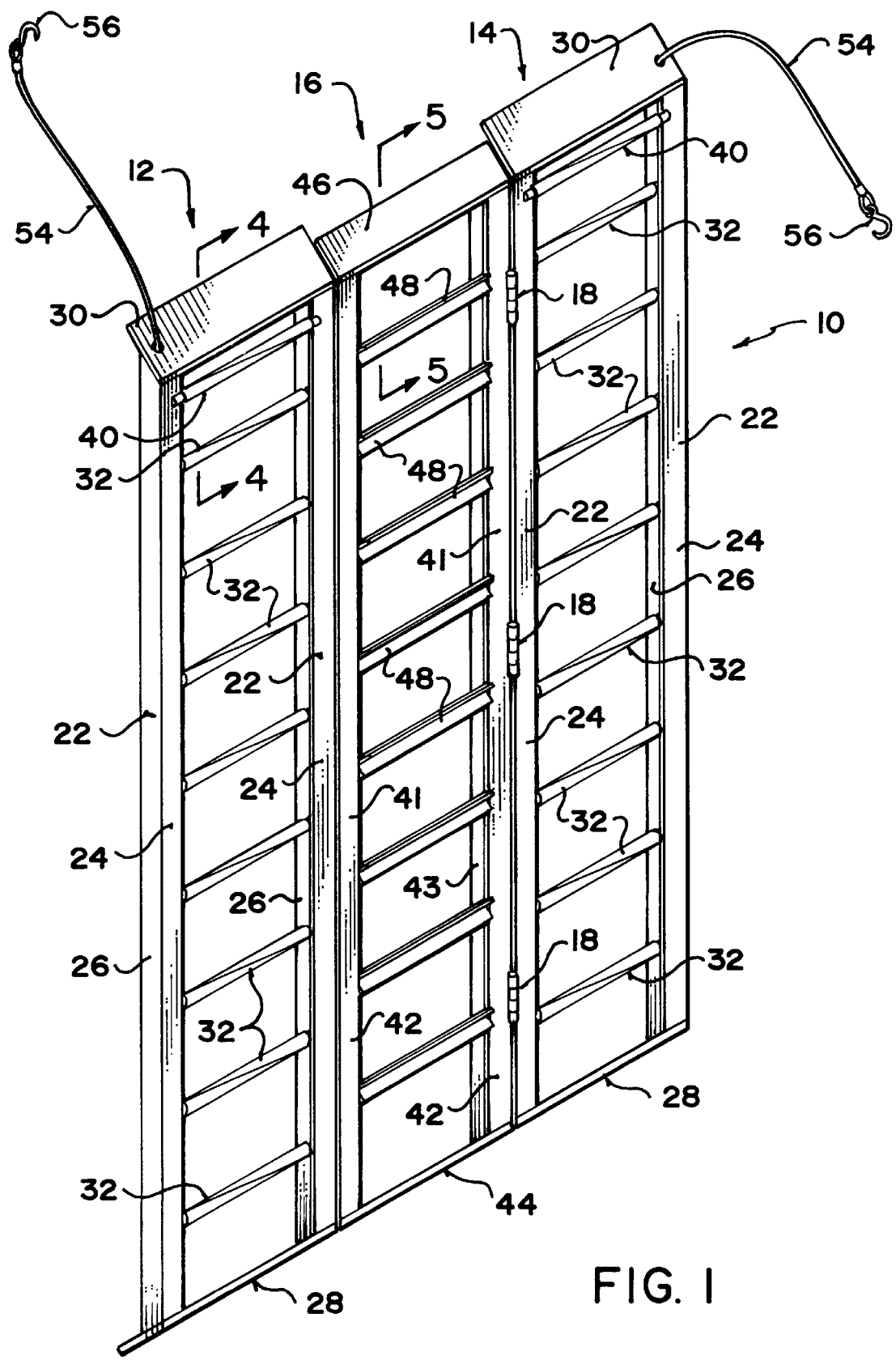
FIG. 1 is an isometric view of a ramp according to the present invention.
Figure 6:
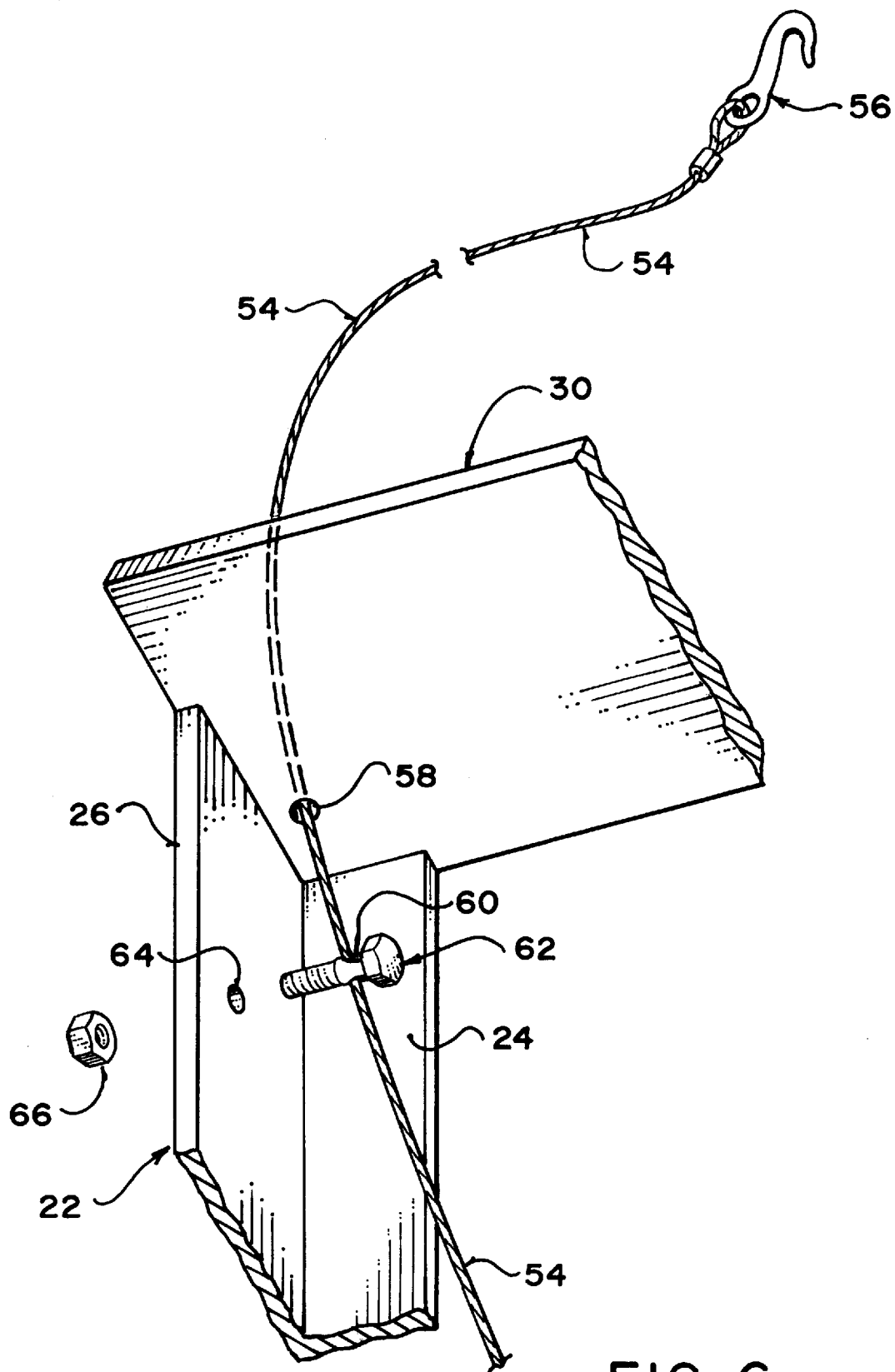
FIG. 6 is a detail view showing a ramp support tether.
Figure 7A:
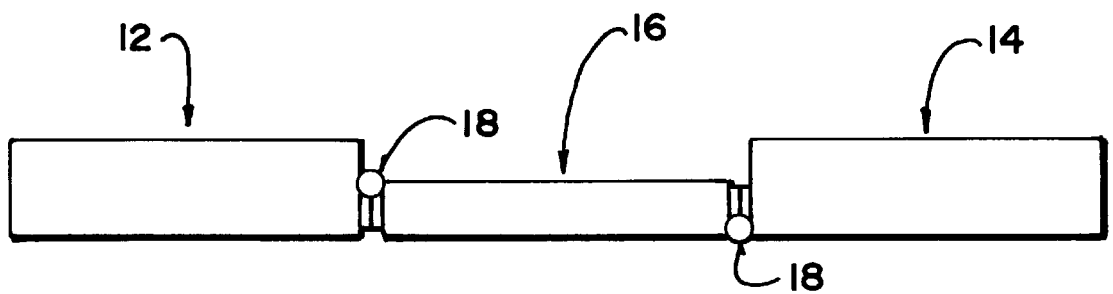
FIGS. 7A, 7B and 7C are views showing the steps in folding of the ramp to a folded transport and storage position.
Figure 7B:
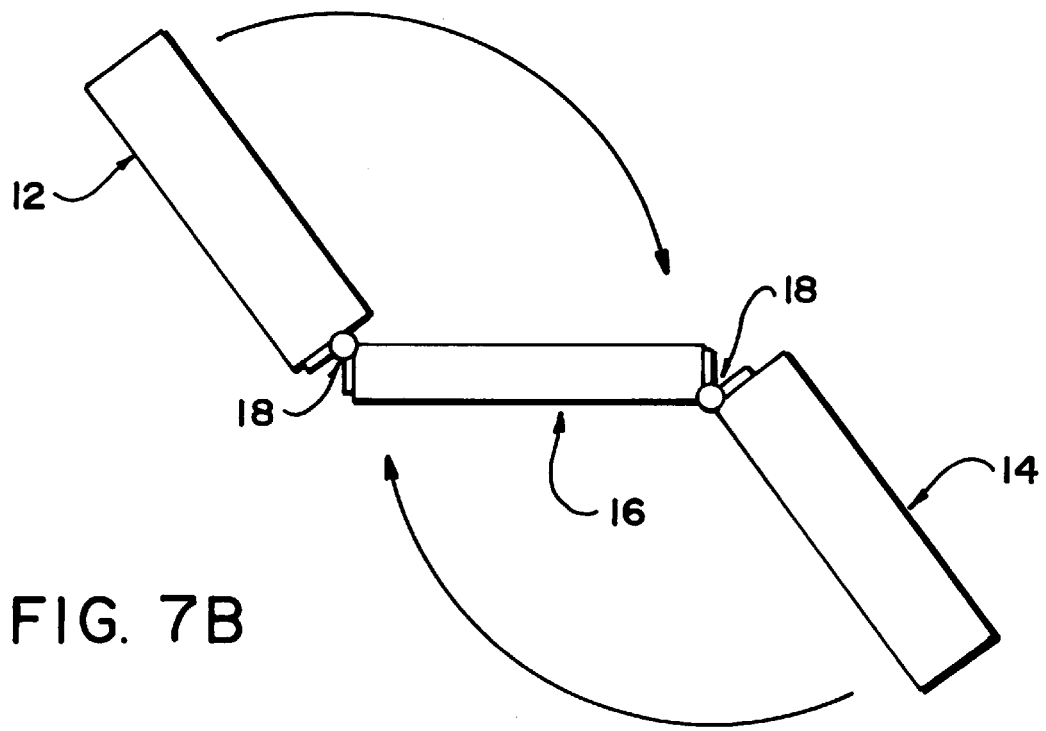

Referring to the accompanying drawings, and especially FIG. 1, there is illustrated a ramp 10 for loading snowmobiles and other items into truck boxes and trailers. The ramp includes two outer sections 12 and 14 and a centre section 16 between the outer sections. The three ramp sections are longitudinally parallel and interconnected by hinges. These include hinges 18 (FIG. 7) connecting the side section 12 to centre section 16 to pivot on a hinge axis on a back side of the ramp and hinges 18 connecting side section 14 to the centre section 16 to pivot on a hinge axis along the front side of the ramp.

The two side sections 12 and 14 have the same configuration so that only one of them will be described in detail. The side section of the ramp has longitudinally extending, parallel side rails 22. Each rail is an angle section with a front flange 24 and a side flange 26. At the bottom end of the side section, the rails 22 are connected by a bottom plate 28 extending across the ends of the rails. Laterally of the ramp section, the plate is at right angles to the rails. It slopes at an angle of 45° to the longitudinal extent of the rails from the front to the back of the ramp section.

A similarly oriented top plate 30 extends between the rails 22 at the top of the ramp. The top plate 30 extends beyond the back side of the ramp section as illustrated most particularly in FIG. 4.

Spaced along the side section of the ramp are rollers 32. These extend between the side rails 22 to provide a ladder like structure. Each roller includes a cylindrical rod 34 extending between the rails 22 and fastened to the back sides of their front flanges 24. Each roller also includes a tube 36 of high density polyvinyl chloride (PVC) extending from end to end of the rod between the rails and sized to rotate on the core rod. The tube is formed with a slit 38 extending from end to end. The slit has a slight helical twist, extending approximately ¼ turn between the ends of the tube. This allows the tube to be opened for installation on or removal from the rod 34.

As illustrated most particularly in FIG. 4, the top rod 40 is offset towards the front of the ramp section and projects beyond the front face of the flanges 24. This rod is positioned close to the top plate 30 to lift snowmobile skis over the front corner of the plate, preventing binding at this point.

The centre section 16 of the ramp has two side rails 41 that are of angle section. Each rail has a front flange 42 and a side flange 43.

At the bottom of the centre ramp section, the rails 41 are joined by a bottom plate 44 that corresponds to the bottom plates 28 of the side sections. At the top, is a top plate 46 corresponding to the top plate 30 of the side sections. In this case however, the top plate 46 does not project to the back of the ramp beyond the side rails 42.

Extending across the centre section, between the rails 41 are longitudinally spaced cleats 48. Each cleat is an angle section with two flanges 50 and 52 projecting beyond the front face of the front flange 42 of each side rail.

At the upper end of each side section 12, adjacent the outer rail 22 is a wire cable 54. This has an anchor hook 56 connected to one end for hooking on any convenient structure on the truck or trailer with which the ramp is to be used. The cable runs through a bore 58 in the top plate 30 of the side section and through a diametral bore 60 in a bolt 62. The bolt passes through a bore 64 in the side flange 26 of the adjacent rail 22 and is fitted to a nut 66 on the opposite side of the flange from the cable 54. This serves as a clamp for adjustably clamping the length of the cable 54 to the ramp to adjust the length of cable extending from the ramp to suit the structure with which it is to be used.

In use, the ramp is opened to the condition illustrated in FIG. 1 and is laid out with the top plates 30 of the side sections overlapping the surface onto which a snowmobile is to be loaded. The anchor hooks 56 on the cables 54 are engaged with a support structure of any appropriate sort associated with the deck onto which the snowmobile is to be loaded so that the ramp will not slide away from that surface and drop onto the ground. The snowmobile is then driven up the ramp onto the truck, trailer or other surface. As it travels along the ramp, the tubes 36 of the rollers 32 rotate to minimize binding of the skis and their runners on the ramp structure. The cleats 48 of the centre section provide traction for the snowmobile track for driving the snowmobile up the ramp.

Where the ramp is intended to be used with something other than a snowmobile, for example an all terrain vehicle, the tubes 36 may readily be removed from the rollers to provide the wheels of the vehicle with better traction.

Figure 7C:
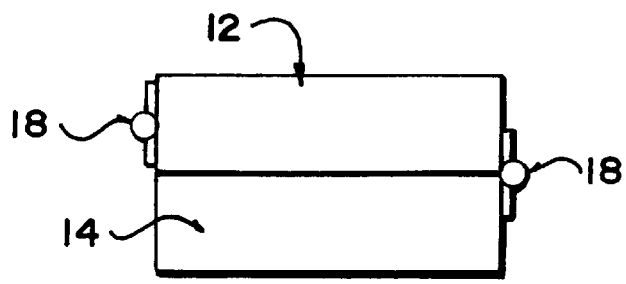

For storage, the extended ramp may be folded along the hinge axes of hinges 18 and 20 as illustrated 7A, 7B and 7C to the folded condition illustrated in FIG. 7C which is suitable for transportation and storage.

While a three section ramp has been described in the foregoing, it is to be understood that other ramp formats are possible. Of importance for loading snowmobiles is the configuration of the outer ramp section with its roller supports for the snowmobile skis. These sections can be used independently for supporting snowmobile skis. A single section of this configuration is also particularly useful in loading other items, for example a boat, where the keel of the boat will ride on the rollers.

It will thus be seen that the present invention provides a ramp of considerable versatility but with special utility in loading and unloading snowmobiles from trucks, trailers or the like. While one particular embodiment of this ramp has been described in the foregoing, it is to be understood that others are possible and are intended to be included with the scope of the appended claims.

I claim:

1. A ramp for loading and unloading snowmobiles comprising:

two longitudinally extending, laterally spaced apart ski supporting sections, each comprising;

two spaced apart rails;

a plurality of support members comprising a cylindrical member extending laterally between the rails and spaced longitudinally apart therealong, each said cylindrical member being non-rotatably fixed to the rails;

and a plurality of removable and reengaaeable roller elements one being arranged around each one of said plurality of support members for rolling engagement with a snowmobile ski; each said roller element comprising a removable and reengageable cylindrical sheath arranged to surround the fixed cylindrical member in direct contact with the cylindrical member for sliding rotation about the cylindrical member such that the cylindrical member remains fixed and the sheath rotates relative thereto, said cylindrical sheath having a helical slit extending longitudinally therealong allowing ready removal and reengagement of the sheath on the support member;

and a track supporting section between the ski supporting sections, the track supporting section comprising means for tractional engagement with a snowmobile track.

2. A ramp according to claim 1 wherein the sheath comprises a sleeve of plastic material.

3. A ramp according to claim 1 wherein the ramp has a top end and ramp support means at the top end for supporting the ramp from the tailgate of a pickup truck.

4. A ramp according to claim 3 wherein the ramp support means comprise a flat plate extending laterally across the top of each ski support section and inclined at an angle to the longitudinal extent of the ramp.

5. A ramp according to claim 4 wherein the ramp support means further comprise two flexible tension elements, clamps for clamping the tension elements at select positions therealong to the ramp and anchor means at a distal end of each flexible tension element.

6. A ramp according to claim 1 wherein the means for tractional engagement comprise a plurality of laterally extending, longitudinally spaced cleats.

7. A ramp according to claim 1 including hinge means connecting the ski support and ramp sections to opposite sides of the track supporting section for pivotal movement about respective longitudinal axes between an extended condition with the ski supporting sections on opposite lateral sides of the track supporting section, and a folded condition with the sections stacked with the track supporting section between the ski supporting section.

* * * * *